United States Patent [19]

Imazawa et al.

[11] Patent Number: 5,227,987
[45] Date of Patent: Jul. 13, 1993

[54] DIGITAL SIGNAL PROCESSOR FOR EXECUTING MULTICHANNEL PROCESSING OF ANALOG INPUTS AND OUTPUTS

[75] Inventors: Koji Imazawa; Akira Kikuchi, both of Kokubunji; Mitsumasa Satoo, Ohme, all of Japan

[73] Assignees: Hitachi, Ltd.; Hitachi VLSI Engineering Corp., both of Tokyo, Japan

[21] Appl. No.: 670,251

[22] Filed: Mar. 15, 1991

[30] Foreign Application Priority Data

Mar. 27, 1990 [JP] Japan .................................. 2-78361

[51] Int. Cl.$^5$ ............................ G06J 1/00; G06F 7/38
[52] U.S. Cl. ..................................... 364/606; 364/736
[58] Field of Search ................. 364/606, 750.5, 736

[56] References Cited

U.S. PATENT DOCUMENTS 4,270,177  5/1981  Endoh et al. ................... 364/606 X
4,275,268  6/1981  Takahashi et al. ............. 364/606 X
4,766,563  8/1988  Fujimoto ......................... 364/750.5

FOREIGN PATENT DOCUMENTS 62-1423    1/1987  Japan .
63-217706  9/1988  Japan .

OTHER PUBLICATIONS

IEEE Journal of Solid-State Circuits, vol. SC-15, No. 1, Feb. 1980, "An NMOS Microprocessor for Analog Signal Processing", M. Townsend et al, pp. 33–38.

Primary Examiner—Tan V. Mai
Attorney, Agent, or Firm—Fay, Sharpe, Beall, Fagan, Minnich & McKee

[57] ABSTRACT

A multichannel digital signal processor includes a plurality of sets of analog-to-digital (A/D) and digital-to-analog (D/A) conversion portions. Predetermined ones of the plurality of A/D and D/A conversion portions are selected in accordance with processing steps or with the required precision of the digital signal processing.

34 Claims, 8 Drawing Sheets

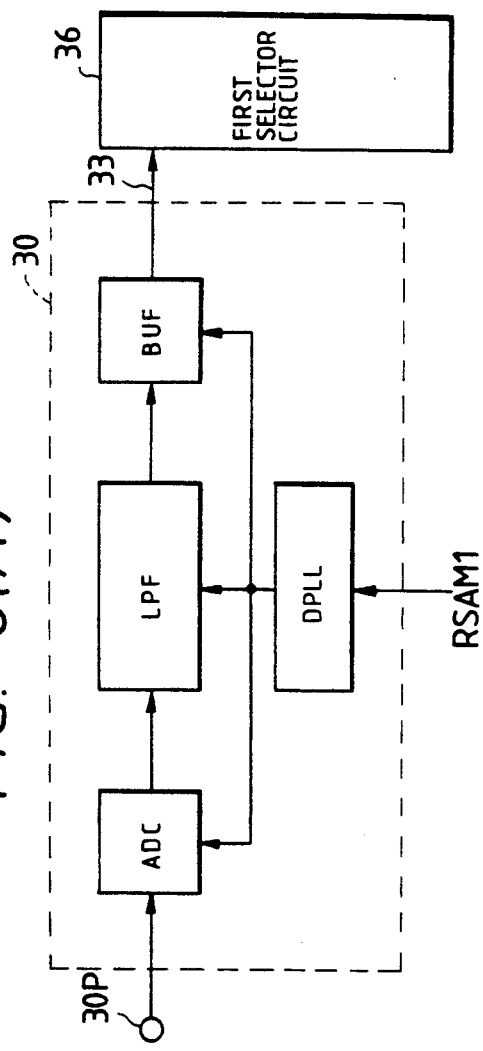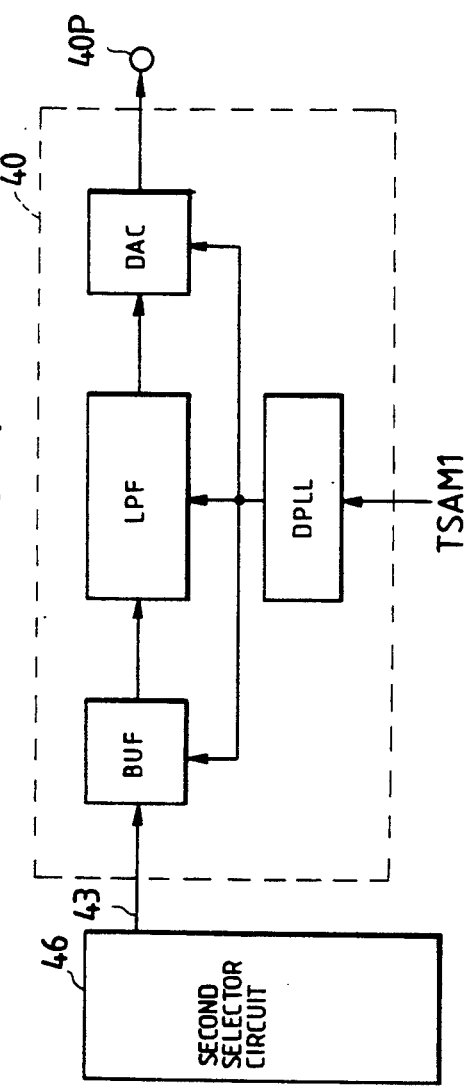

DIGITAL SIGNAL PROCESSOR FOR EXECUTING MULTICHANNEL PROCESSING OF ANALOG INPUTS AND OUTPUTS

BACKGROUND OF THE INVENTION

The present invention relates to digital signal processing technology which is applicable to the fields of sound, voice, communications, servo controls, etc. More particularly, it relates to techniques which are effective when applied to the multichannel arrangement of a hybrid analog/digital integrated circuit, such as a digital signal processor that has an analog circuit section including an A/D (analog-to-digital) conversion portion and a D/A (digital-to-analog) conversion portion, and a digital signal processing section for executing the multiply-and-sum computations etc. of digital signals.

In communications and other controls within the speech bandwidth as performed with a MODEM (modulator-demodulator), or ISDN (integrated speech-/data network), etc., it is possible to employ a digital signal processor which has an A/D converter as well as a D/A converter and a digital signal processing section. Heretofore, various techniques have been proposed in order to enhance the versatility and applicability of the digital signal processor.

For example, a digital signal processor having an analog circuit section in which the functions of a D/A converter and a sequential comparison type A/D converter configured of a comparator circuit and an D/A converter circuit may be selected in time division as stated in IEEE JOURNAL OF SOLID-STATE CIRCUITS, VOL. SC-15, No. 1, Feb. 1980, pp. 33-38. The digital signal processor is operated as follows: One of a plurality of analog signal input pins is selected to apply a corresponding analog signal to the analog circuit section through a multiplexer formed on the same chip as that of the analog circuit section. An output from the analog circuit section is delivered to a selected one of a plurality of analog signal output pins through a demultiplexer formed on the same chip. Thus, the digital signal processor achieves the multichannel processing of analog inputs to and from the analog circuit section in which the A/D conversion function and D/A conversion function are selected in time division.

In addition, a digital signal processor disclosed in the official gazette of Japanese Patent Application Laid-open No. 217706/1988 is intended to enhance the versatility and is adapted to programmably set the signal frequency bands of a prefilter arranged at the input stage of an A/D converter and of a postfilter arranged at the output stage of a D/A converter. Each of the respective filters serve to eliminate folded noise.

Also, the official gazette Japanese Utility Model Registration Application Laid-open No. 1423 /1987 discloses a digital signal processor in which the conversion cycle of one set of A/D and D/A converters is changed at will, thereby rendering the applicable processing multifarious.

SUMMARY OF THE INVENTION

With the technique of Japanese Patent Application Laid-open No. 217706/1988 or Japanese Utility Model Registration Application Laid-open No. 1423 /1987, however, the multichannel processing of analog inputs-/outputs is not considered at all, and it is impossible to process the analog signals of a plurality of systems in time division by the using a single digital signal processor.

With the other prior-art technique in which the multichannel processing of analog inputs/outputs is taken into consideration, the A/D conversion function and D/A conversion function of the analog circuit section are selected in time division, so that the continuity of analog signals required in the mode of transferring the signals in full-duplex fashion cannot be secured with ease. Accordingly, the prior-art digital signal processor will have difficulty coping with the modem which performs data communications with the speech bandwidth through modulation and demodulation. Further, since a digital signal processing section disclosed in the cited reference is not furnished with a multiplier unit, the efficiency of multiply-and-sum computations which occur frequently in digital signal processing becomes low. Still further, the digital signal processor has arithmetic operation steps consisting of simple repeated control sequences and is incapable of complicated arithmetic controls based on, e.g., the jump of a step for running an operating program. Also in view of these drawbacks, the digital signal processor will have a comparatively limited range of applications.

An object of the present invention is to provide a digital signal processing technique which can execute the multichannel processing of analog inputs/outputs and achieve an enhanced versatility.

Another object of the present invention is to provide a digital signal processor which makes it possible to process the analog signals of a plurality of systems in time division with the continuity of the analog signals secured, by the use of the single digital signal processor.

Simultaneously, it is still another object to provide a digital signal processor of high processing capability.

The above and other objects and novel features of the present invention will become apparent from the description of this specification when read in conjunction with the accompanying drawings.

Typical aspects of performance of the present invention will be briefly summarized below.

An A/D conversion portion and a D/A conversion portion to be connected to a digital signal processing section are arranged so as to be capable of operating in parallel with each other, and analog inputs/outputs are processed in a multichannel way. Simultaneously, a multiplier unit is included in the digital signal processing section, thereby to enhance the efficiency of a multiply-and-sum computation and to enhance the functions of arithmetic steps.

As an expedient for the multichannel processing, a plurality of sets of A/D and D/A conversion portions are arranged, and predetermined ones are respectively selected from among the plurality of A/D and D/A conversion portions in accordance with processing steps or with the required accuracy of digital signal processing. On this occasion, the characteristics of the A/D and D/A conversion portions in a pair may be either identical to each other or different from each other. As another expedient for the multichannel processing, one set of A/D and D/A conversion portions are arranged, and analog input and output terminals for connecting them are selected through selection means such as a multiplexer and a demultiplexer. As still another expedient, it is also possible to employ both the aforementioned expedients conjointly.

As an expedient for enhancing the efficiency of the multiply-and-sum computation and the functions of arithmetic steps in the digital signal processing section, control steps to be executed by an instruction control portion, which is furnished with an instruction memory holding an operating program for digital signal processing, are set so as to be capable of altering the steps of running the operating program in accordance with an external or internal phenomenon.

According to the digital signal processor of the present invention as described above, the A/D conversion portion and D/A conversion portion to be connected to the digital signal processing section are arranged so as to be capable of operating in parallel with each other, and the analog inputs/outputs are processed in the multichannel way. This makes it possible to process the analog signals of a plurality of systems in time division and with the continuity of the analog signals ensured, by the use of the single digital signal processor.

Moreover, the multiplier unit is included in the digital signal processing section, thereby to enhance the efficiency of the multiply-and-sum computation, and the steps of running the operating program are made alterable in accordance with the phenomenon occurring internally or externally. This enhances the processing capability of the processor in the case of supporting the multichannel processing of the analog inputs/outputs.

On this occasion, when the expedient for the multichannel processing is such that the plurality of sets of A/D and D/A conversion portions are arranged and that the predetermined ones are respectively selected from among the plurality of A/D and D/A conversion portions in accordance with the processing steps or with the required accuracy of the digital signal processing, the single digital signal processor can cope with even the analog inputs/outputs whose characteristics such as analog signal frequencies are different.

On the other hand, when the expedient for the multichannel processing is such that the A/D and D/A conversion portions in one set are arranged and that the analog input and output terminals to be connected thereto are selected through the multiplexer and the demultiplexer, the multichannel processing of the analog signals whose characteristics are uniform can be achieved with the smallest circuit scale.

BRIEF DESCRIPTION OF THE DRAWINGS

FIG. 8(A) is a circuit diagram of an A/D conversion portion;

FIG. 8(B) is a circuit diagram of a D/A conversion portion; and

DESCRIPTION OF THE PREFERRED EMBODIMENTS

Figure 1:
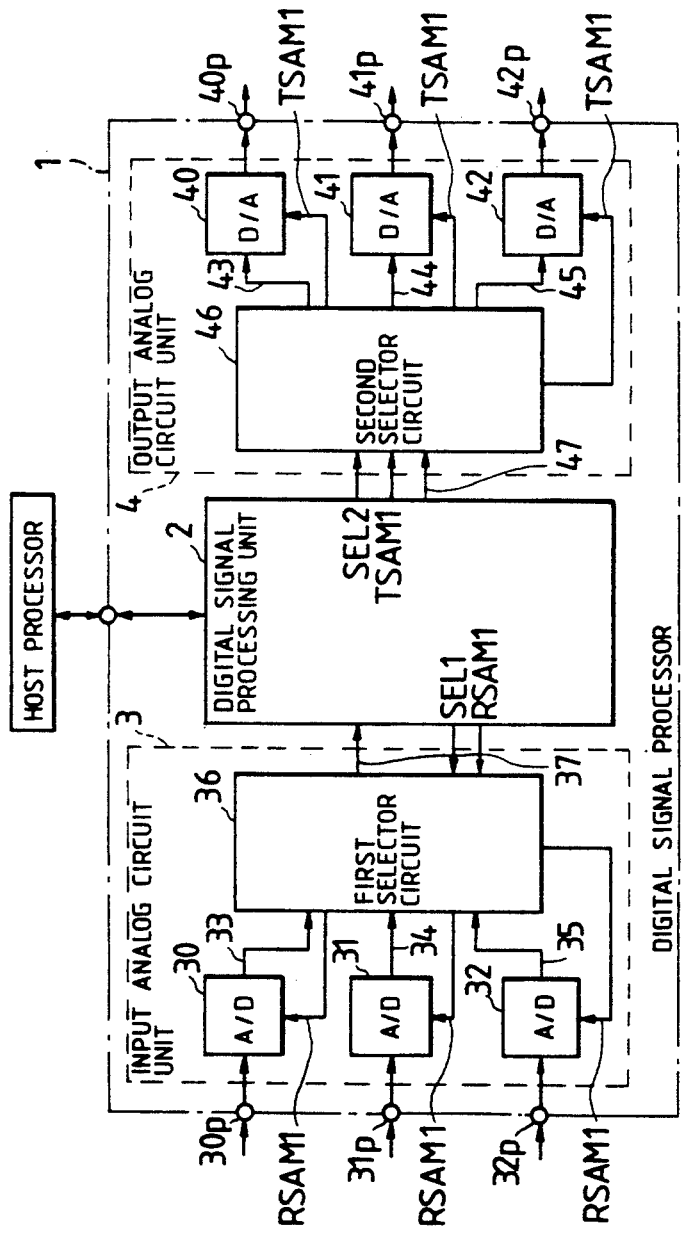
FIG. 1 is a block diagram of an embodiment of a digital signal processor according to the present invention.

Shown in FIG. 1 is a block diagram of an embodiment of a digital signal processor according to the present invention. The digital signal processor 1 depicted in the figure is formed on a single semiconductor substrate such as of silicon, including a digital signal processing unit 2 which is interfaced with, for example, a host processor, and an input analog circuit unit 3 and an output analog circuit unit 4 which are connected to the digital signal processing unit 2. Known techniques for producing semiconductor integrated circuits can be applied to the manufacture of the digital signal processor 1.

The digital signal processing unit 2 adopts the so-called Harvard architecture wherein a program memory and a data memory are isolatedly constructed, and the arithmetic data transfer system and instruction transfer system thereof are basically isolated. The arithmetic system has the data memory for storing variable data, coefficient data, etc. in digital signal processing, and it can transfer data items in parallel through a plurality of internal buses. The digital signal processing unit 2 further comprises a multiplier unit and an arithmetic-logic unit which are individually arranged, and it can execute in parallel a multiplication and an addition which occur frequently in the digital signal processing. Additionally, the unit 2 performs computations, accesses to the memories, and input/output controls for the digital signal processing in such a way that data processing algorithms for the arithmetic controls, etc. of this section are held in a control storage such as micro-ROM and that instructions are read out from the control storage in accordance with predetermined steps. In particular, the instruction control system of the unit 2 supports an instruction address control which alters the steps of executing the instructions in response to phenomena arising inside and outside the digital signal processor 1.

Although not especially restricted, the input analog circuit unit 3 comprises three A/D conversion portions 30, 31 and 32, the respective input terminals of which are individually coupled to external analog signal input terminals 30p, 31p and 32p. The output terminals of the A/D conversion portions 30–32 are respectively coupled to the unshown input terminals of a first selector circuit 36 through signal lines 33–35, and one of the input terminals is selected to apply a corresponding digital signal to the digital signal processing unit 2 via a signal line 37. Although no special restriction is intended, the first selector circuit 36 selectively connects any of the A/D conversion portions and the digital signal processing unit 2 in accordance with a 2-bit control signal SEL1 which is applied thereto from the digital signal processing unit 2. Although no special restriction is meant, the A/D conversion portion connected with the digital signal processing unit 2 by the control signal SEL1 is supplied with a sampling enable clock signal RSAM1 through the first selector circuit 36 from the digital signal processing unit 2. In supplying the sampling enable clock signal RSAM1, the first selector circuit 36 is operated as a demultiplexer by the signal SEL1.

Although not especially restricted, the output analog circuit unit 4 comprises three D/A conversion units 40, 41 and 42, the respective output terminals of which are individually coupled to external analog signal output terminals 40p, 41p and 42p. The unshown input terminals of the D/A conversion units 40-42 are respectively coupled to the unshown output terminals of a second selector circuit 46 through signal lines 43-45. The second selector circuit 46 supplies a selected one of the D/A conversion portions with a digital signal which is applied thereto through one of signal lines 47 from the digital signal processing unit 2. Although no special restriction is intended, the second selector circuit 46 selectively connects any of the D/A conversion portions and the digital signal processing unit 2 in accordance with a 2-bit control signal SEL2 which is applied thereto from the digital signal processing unit 2. Although no special restriction is meant, the D/A conversion portion connected with the digital signal processing unit 2 by the control signal SEL2 is supplied with a sampling enable clock signal TSAM1 through the second selector circuit 46 from the digital signal processing unit 2. In supplying the sampling enable clock signal TSAM1, the second selector circuit 46 is operated as a demultiplexer by the signal SEL2.

As understood from the construction thereof, the digital signal processor 1 in FIG. 1 owns three channels so as to be independent with regard to analog signal inputs/outputs and comprises the A/D conversion portion and D/A conversion portion peculiar to each channel so as to be capable of operating in parallel. Herein, the digital signal processing unit 2 is shared by the three channels. Accordingly, the single digital signal processor 1 is permitted to be utilized for the three analog circuits or three channels in such a way that the operations of digital signal processing (multiply-and-sum computations) for the individual channels are executed in time division. In particular, since the A/D conversion units and D/A conversion units are arranged independently for the respective channels, even three kinds of analog signal inputs/outputs of characteristics differing from one another, such as high-frequency analog signals and low-frequency analog signals, can be coped with by the single digital signal processor 1.

FIG. 8(A) shows a circuit diagram of the A/D conversion unit 30. Since each of the A/D conversion units 31 and 32 has the same circuit arrangement as that of the A/D conversion unit 30, it shall be omitted from description.

The A/D conversion unit 30 includes an A/D converter ADC, a filter circuit LPF, a buffer circuit BUF and a digital phase-locked loop circuit DPLL. An analog signal supplied from the external analog signal input terminal 30p is converted into a digital signal by the A/D converter ADC. The digital signal is supplied to the first selector circuit 36 through the filter circuit LPF, buffer circuit BUF and signal line 33. Upon receiving the sampling enable clock signal RSAM1, the digital phase-locked loop circuit DPLL generates the internal operation timing signal of the A/D conversion unit 30, this signal being delivered to the A/D converter ADC, filter circuit LPF and buffer circuit BUF. The conversion precisions and rates, the numbers of bits, etc. of the A/D converters ADC included in the A/D conversion units 30-32 may be either equal or unequal to one another.

FIG. 8(B) shows a circuit diagram of the D/A conversion unit 40. Since each of the D/A conversion units 41 and 42 has the same circuit arrangement as that of the D/A conversion unit 40, it shall also be omitted from description.

The D/A conversion unit 40 includes a D/A converter DAC, a filter circuit LPF, a buffer circuit BUF and a digital phase-locked loop circuit DPLL. A digital signal is supplied from the second selector circuit 46 to the D/A converter DAC through the signal line 43, buffer circuit BUF and filter circuit LPF. The D/A converter DAC converts the digital signal into an analog signal, which is supplied to the external analog signal output terminal 40p. Upon receiving the sampling enable clock signal TSAM1, the digital phase-locked loop circuit DPLL generates the internal operation timing signal of the D/A conversion unit 40, this signal being delivered to the D/A converter DAC, filter circuit LPF and buffer circuit BUF. The conversion precisions and rates, the numbers of bits, etc. of the D/A converters DAC included in the D/A conversion units 40-42 may be either equal or unequal to one another.

Figure 2:
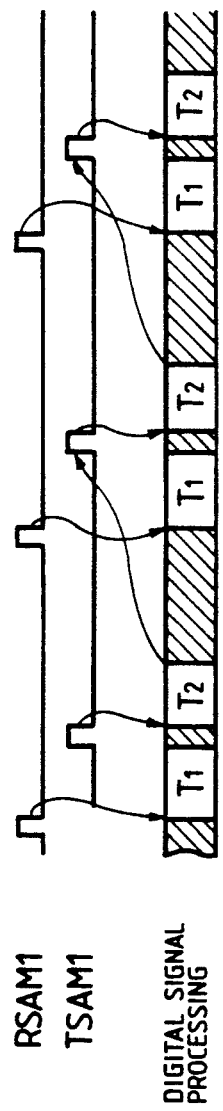
FIG. 2 is a timing chart exemplifying the operation timings of the digital signal processor in FIG. 1.

FIG. 2 shows a timing chart of the operations of the digital signal processor 1 in FIG. 1.

When the input analog circuit unit 3 and the output analog circuit unit 4 handle information items which are transferred within the speech bandwidth, the reproducibility of such transmission information, is guaranteed by setting an analog sampling frequency of at least about 6.8 kHz, for example, at approximately 9.6 kHz. On the other hand, the machine cycle of the digital signal processing unit 2 is very short as compared with an analog sampling period, and the operating frequency thereof is set to be in the order of MHz, for example, approximately 4-10 MHz likewise to those of a microcomputer, a microprocessor etc. Here, it is assumed that sampling periods as illustrated in FIG. 2 have been determined by the sampling enable clock signals RSAM1 and TSAM1 of 9.6 kHz.

The digital signal processing unit 2 executes an interrupt process in response to the fall of the sampling enable signal RSAM1 or TSAM1 arising when this section is sending or receiving digital signals to or from the host processor (as indicated by each hatched part in FIG. 2).

By way of example, the digital signal processing unit 2 executes the multiply-and-sum computation process of the digital signals supplied through the signal line 37 from the input analog circuit unit 3 (as indicated by each part T1 in the figure), in response to the fall of the sampling enable signal RSAM1. The result of the process is supplied to, e.g., the host processor in accordance with a clock signal which is formed of the operating frequency of the digital signal processing unit 2.

Also, by way of example, the digital signal processing unit 2 executes the multiply-and-sum computation process of the digital signals supplied from, e.g., the host processor (as indicated by each part T2 in the figure), in response to the fall of the sampling enable signal TSAM1. The result of the process is once stored in a serial input/output register not shown, and is supplied to the output analog circuit unit 4 through the signal line 47 in synchronism with the leading edge of the next sampling enable signal TSAM1.

Although no special restriction is meant, the digital signal processing unit 2 further executes the control of an unshown timer circuit, etc. at the hatched parts in some cases.

In this manner, the digital signal processing unit 2 can execute in time division, the multiply-and-sum computation process of the digital signals supplied from the input analog circuit unit 3 and that of the digital signals to be supplied to the output analog circuit unit 4.

Alternatively, the digital signal processing unit 2 may well execute the interrupt process in response to the rise of the sampling enable signal RSAM1 or TSAM1.

As described above, the A/D conversion unit and D/A conversion unit peculiar to each channel can operate in parallel in accordance with the respective sampling timings thereof, and the continuity of analog signals required for transferring the signals in full duplex can be ensured. Thus, the digital signal processor 1 of this embodiment can cope in multichannel fashion even with a modem etc. which perform data communications with the speech band on the basis of modulation and demodulation.

Figure 3:
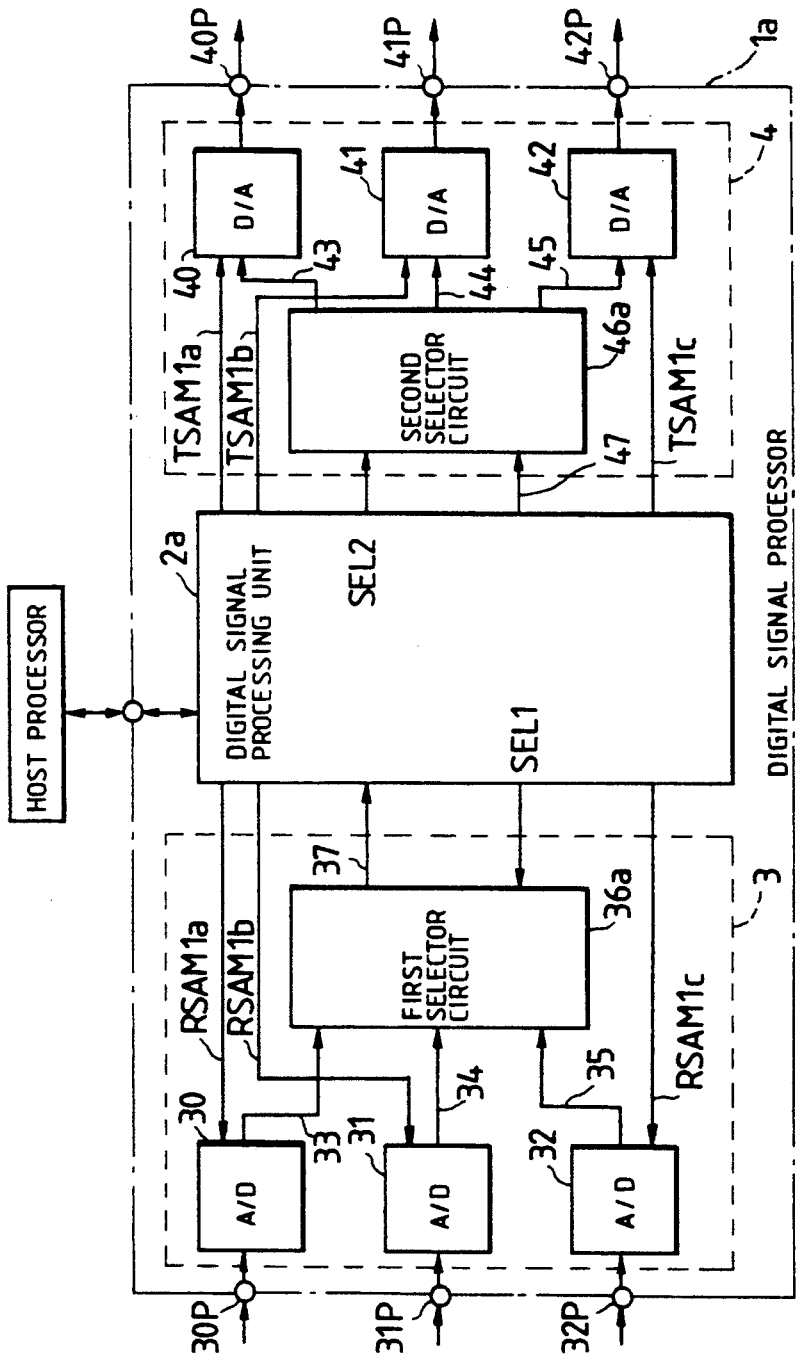
FIG. 3 is a block diagram of another embodiment of the digital signal processor according to the present invention.

FIG. 3 shows an embodiment of a digital signal processor 1a which performs the parallel operations of a plurality of channels in time division.

Figure 4:
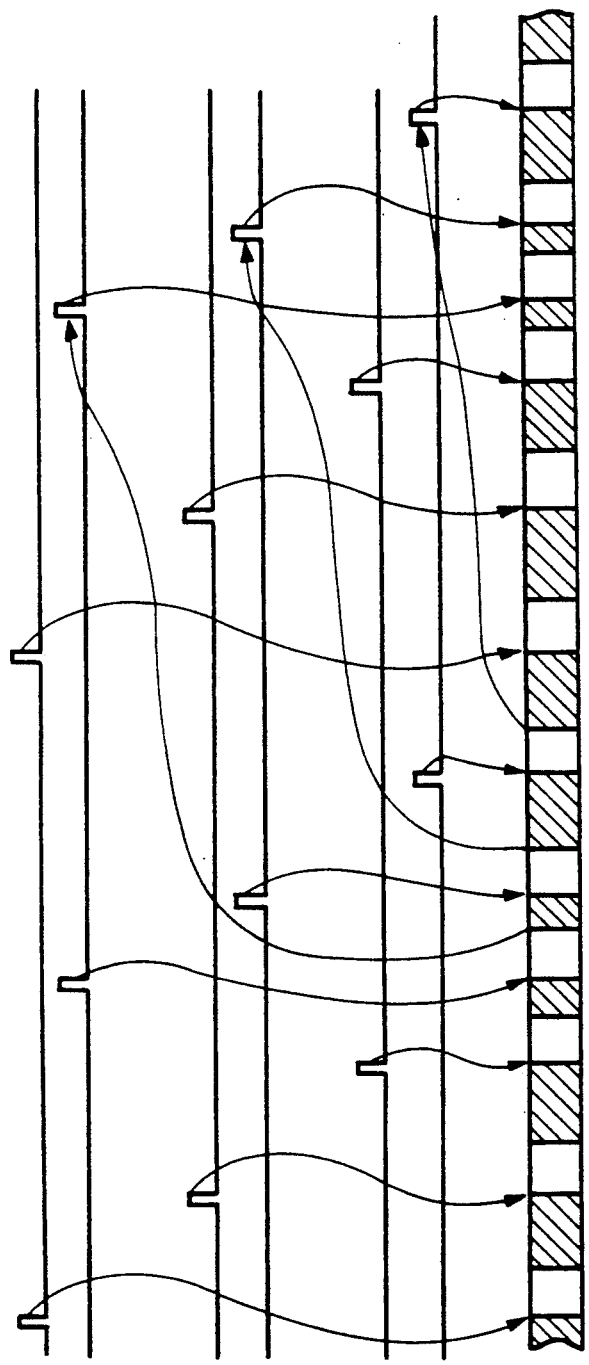
FIG. 4 is a timing chart exemplifying the operation timings of the digital signal processor in FIG. 3.

In order to operate the plurality of channels in parallel in time division, a digital signal processing unit 2a whose operating speed is high relative to the sampling periods of the respective channels is adopted. In addition, the digital signal processing unit 2a supplies sampling enable clock signals RSAM1a–RSAM1c which are respectively peculiar to individual A/D conversion units 30–32. Likewise, it supplies sampling enable clock signals TSAM1a–TSAM1c which are respectively peculiar to individual D/A conversion units 40–42. FIG. 4 shows a timing chart of the operations of the digital signal processor 1a in FIG. 3. Also the digital signal processor 1a can execute in time division, the multiply-and-sum computation process of digital signals supplied from an input analog circuit unit 3 and that of digital signals to be supplied to an output analog circuit unit 4. Accordingly, the A/D conversion units and D/A conversion units peculiar to the corresponding channels can operate in parallel in accordance with the respective sampling timings thereof, and the continuity of analog signals required for transferring the signals in full duplex can be ensured. Thus, the digital signal processor 1a of this embodiment can also operate the plurality of channels in parallel in time division when applied to a modem etc. which perform data communications with the speech band on the basis of modulation and demodulation.

Figure 5:
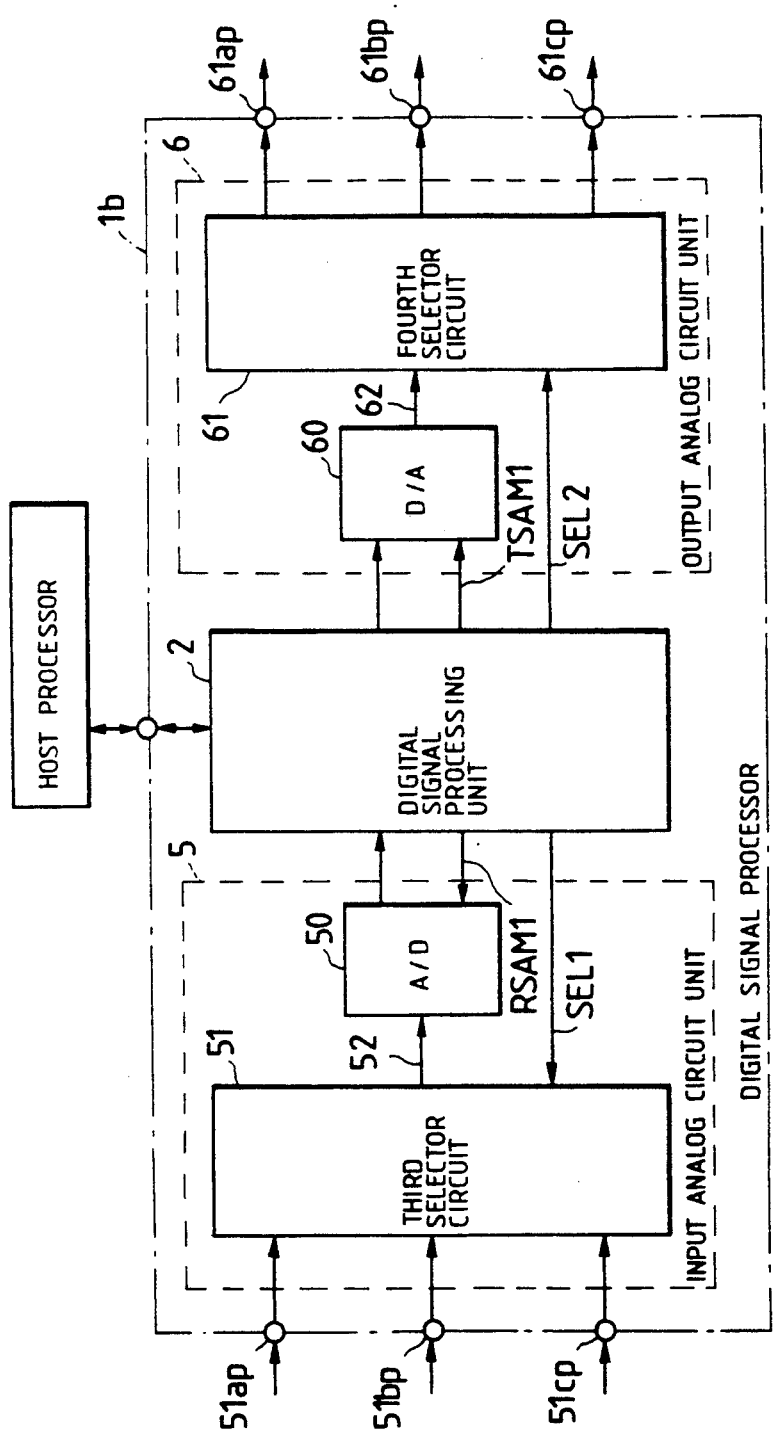
FIG. 5 is a block diagram of still another embodiment of the digital signal processor according to the present invention.

FIG. 5 shows another embodiment which comprises an A/D conversion unit and a D/A conversion unit in one set.

The digital signal processor 1b shown in the figure comprises an input analog circuit unit 5 and an output analog circuit unit 6, together with the digital signal processing unit 2 stated before.

The input analog circuit unit 5 includes the single A/D conversion unit 50, the output terminal of which is coupled to the digital signal processing unit 2 and the input terminal of which is coupled to a third selector circuit 51. The third selector circuit 51 operates as a multiplexer having three inputs and one output, and the three input terminals thereof are individually coupled to respective external analog signal input terminals 51ap, 51bp and 51cp. The third selector circuit 51 selectively connects one of the external analog signal input terminals and the A/D conversion unit 50 in accordance with the 2-bit control signal SEL1 which is applied from the digital signal processing unit 2. An analog signal is supplied from the selected external analog signal input terminal to the A/D conversion unit 50 through a signal line 52. Although not especially restricted, the sampling enable clock signal RSAM1 for the A/D conversion unit 50 is directly delivered from the digital signal processing unit 2 to this A/D conversion unit 50.

The output analog circuit unit 6 includes the single D/A conversion unit 60, and is supplied with a digital signal and the sampling enable clock signal TSAM1 from the digital signal processing unit 2. The output terminal of the D/A conversion unit 60 is connected through a signal line 62 to the input terminal of a fourth selector circuit 61 which operates as a demultiplexer having one input and three outputs. The output terminals of the fourth selector circuit 61 are respectively connected to external analog signal output terminals 61ap, 61bp and 61cp. The output signal (analog signal) of the fourth selector circuit 61 is applied to any external analog signal output terminal selected by the 2-bit selection signal SEL2 which is delivered from the digital signal processing unit 2.

As understood from the construction thereof, the digital signal processor 1b in FIG. 5 owns three channels so as to be independent with regard to analog signal inputs/outputs and comprises the A/D conversion unit 50 and D/A conversion unit 60 shared by all the channels, so as to be capable of operating in parallel. Accordingly, the single digital signal processor 1b is permitted to be utilized for the three analog circuits or three channels in such a way that the operations of digital signal processing for the individual channels are executed in time division. Since, however, the A/D conversion unit and D/A conversion unit are shared by all the channels, the digital signal processor 1b is unsuited to multichannel processing for the inputs/outputs of analog signals which differ in characteristics such as the precisions or rates of A/D and D/A conversions or the numbers of bits thereof. It is applied to the processing of analog signals of uniform characteristics and is utilized for an LSI for CODEC in a telephone exchange by way of example. On the other hand, in the digital signal processor 1b, the chip occupation proportion of the whole analog circuit section is made smaller than in each of the preceding two embodiments.

Figure 6:
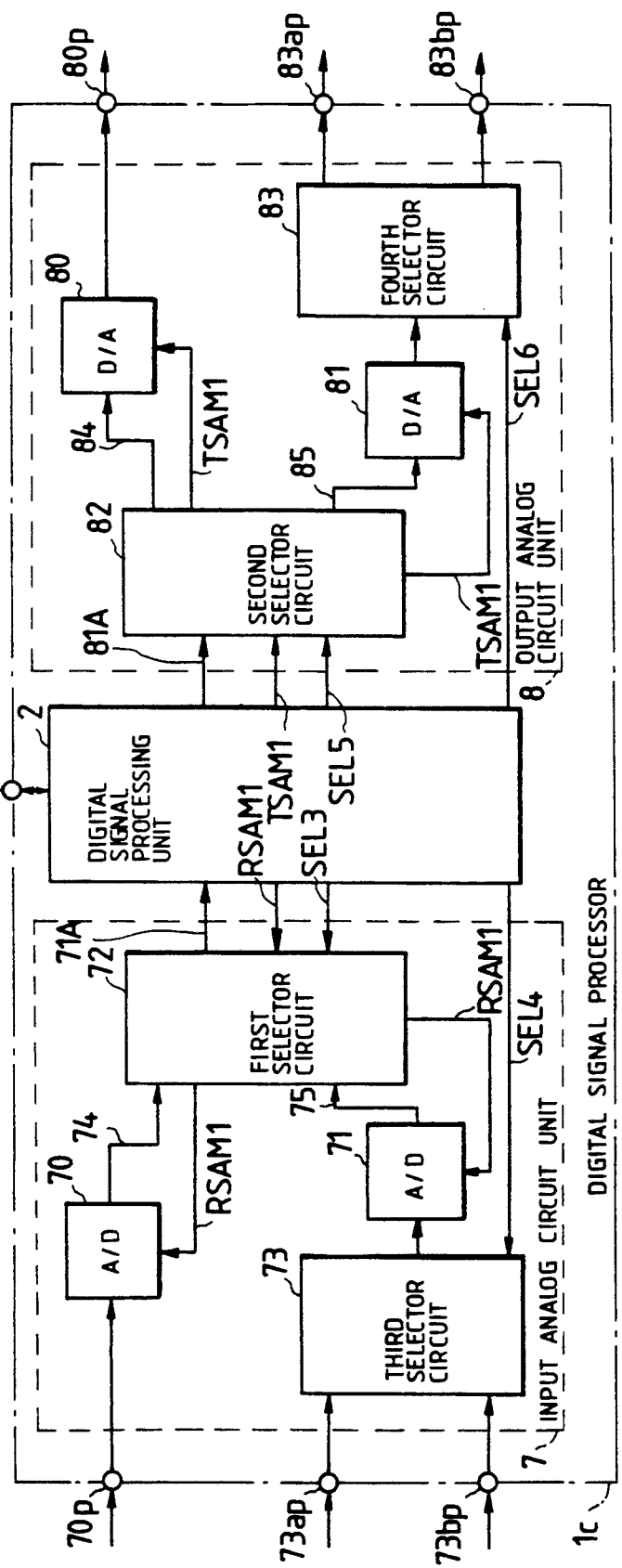
FIG. 6 is a block diagram of yet another embodiment of the digital signal processor according to the present invention.

FIG. 6 shows till another embodiment in which the constructions of FIG. 1 and FIG. 5 are combined.

The digital signal processor 1c shown in the figure comprises an input analog circuit unit 7 and an output analog circuit unit 8, together with the digital signal processing unit 2 stated before.

The input analog circuit unit 7 includes two A/D conversion units 70, 71, a first selector circuit 72, and a third selector circuit 73. The first selector circuit 72 operates as a multiplexer of 2-input and 1-output type for the digital signal outputs of the A/D conversion units 70 and 71, and also operates as a demultiplexer of 1-input and 2-output type for the sampling enable signal RSAM1 supplied from the digital signal processing unit 2. By way of example, when a selection signal SEL3 is set at its high level, the sampling enable signal RSAM1 is applied to the A/D conversion unit 70, and the digital signal output of this A/D conversion unit 70 is delivered to the digital signal processing unit 2 through a signal line 74, the first selector circuit 72 and a signal line 71A. On the other hand, when the selection signal SEL3 is set at its low level, the sampling enable signal RSAM1 is applied to the A/D conversion unit 71, and the digital signal output of this A/D conversion unit 71 is delivered to the digital signal processing section 2 through a signal line 75. Incidentally, the A/D conversion unit 70 is supplied with an analog signal from an external analog signal input terminal 70p.

The third selector circuit 73 operates as a multiplexer of 2-input and 1210-output type, by which analog signal inputs supplied from external analog signal input terminals 73ap and 73bp are delivered to the A/D conversion unit 71 in accordance with the levels of a selection signal SEL4.

The output analog circuit units 8 includes two D/A conversion units 80, 81, a second selector circuit 82, and a fourth selector circuit 83. The second selector circuit 82 operates as a demultiplexer of 1-input and 2-output type for a digital signal output delivered from the digital signal processing unit 2, and also operates as a demultiplexer of 1-input and 2-output type for the sampling enable clock signal TSAM1 supplied from the digital signal processing unit 2. By way of example, when a selection signal SEL5 is set at its high level, the sampling enable clock signal TSAM1 is applied to the D/A conversion unit 80, and the digital signal is delivered to this D/A conversion unit 80 through a signal line 81A, the second selector circuit 82 and a signal line 84. On the other hand, when the selection signal SEL5 is set at its low level, the sampling enable clock signal TSAM1 is applied to the D/A conversion unit 81, and the digital signal is delivered to this D/A conversion unit 81 through a signal line 85.

The analog signal output of the D/A conversion unit 80 is delivered to an external analog signal output terminal 80p. On the other hand, the analog signal output of the D/A conversion unit 81 is supplied to the input terminal of the fourth selector circuit 83. This fourth selector circuit 83 operates as a demultiplexer of 1-input and 2-output type, by which the analog signal output supplied from the D/A conversion unit 81 is delivered to an external analog signal output terminal 83ap or 83bp in accordance with the level of a selection signal SEL6.

Also the digital signal processor 1c in FIG. 6 owns three channels with regard to analog signal inputs/outputs and comprises the A/D conversion units and D/A conversion units shared by the respective channels, so as to be capable of operating in parallel. Accordingly, the single digital signal processor 1c is permitted to be utilized for the three analog circuits or three channels in such a way that the operations of digital signal processing for the individual channels are executed in time division.

Since the digital signal processor of this embodiment has the two sets of A/D conversion units and D/A conversion units, it can process even analog signals of two different kinds of characteristics.

Figure 7:
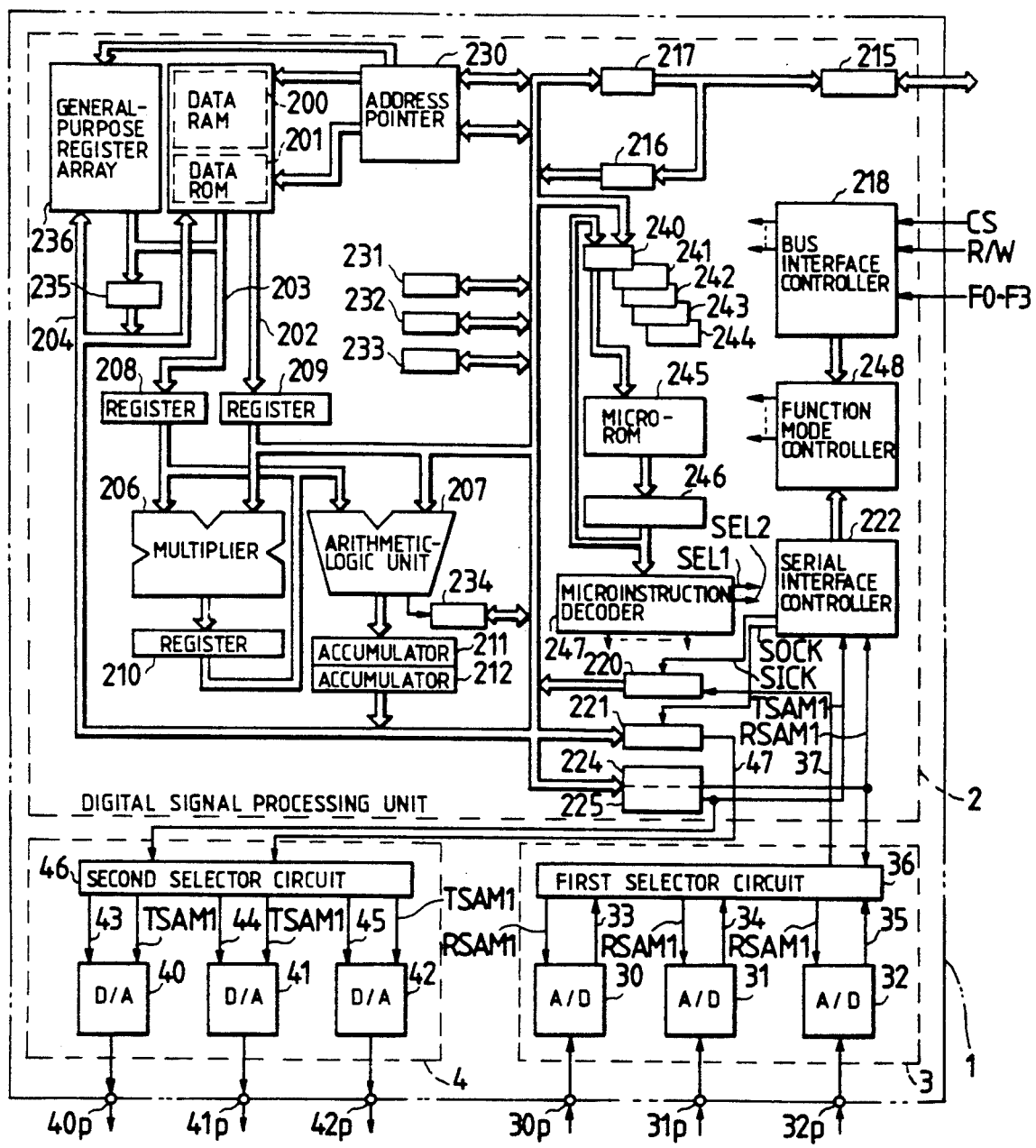
FIG. 7 is a block diagram of an embodiment showing in details the digital signal processor corresponding to FIG. 1, especially the digital signal processing section thereof.

FIG. 7 shows an embodiment of the details of the digital signal processing unit 2 in the digital signal processor 1 corresponding to FIG. 1.

The digital signal processing unit 2 shown in FIG. 7 adopts the so-called Harvard architecture wherein a program memory and a data memory are isolatedly constructed, and the arithmetic data transfer system and instruction transfer system thereof are basically isolated. The arithmetic system comprises a data RAM 200 and a data ROM 201 for storing variable data, coefficient data, etc. in digital signal processing, and it has a plurality of data buses 202-204 connected to the predetermined ports of the memories 200 and 201, so that it can transfer data items in parallel. The arithmetic system further comprises a multiplier unit 206 and an arithmetic-logic unit 207 which are individually arranged, so that it can execute in parallel a multiplication and an addition which occur frequently. By way of example, the write port of the data RAM 200 is coupled to the data bus 204. The read port of the data RAM 200 and that of the data ROM 201 are respectively connected to the data buses 202 and 203, and data items read out on the data buses 202 and 203 can be respectively supplied to both the multiplier unit 206 and the arithmetic-logic unit 207 through registers 209 and 208. Besides, the multiplier unit 206 and the arithmetic-logic unit 207 can be supplied with data items from the data bus 204. The computed result of the multiplier unit 206 is held in a register 210 for the period of one instruction cycle, and is thereafter given to the arithmetic-logic unit 207. This arithmetic-logic unit 207 subjects to the addition, a subtraction etc., the data items which are supplied thereto selectively from the register 210, the data RAM 200 or data ROM 201 and the data bus 204. The processed result of the arithmetic-logic unit 207 is once held in accumulators 211 and 212, and is thereafter brought back to the data bus 204.

The digital signal processing section 2 is interfaced with the host processor located outside, by a parallel input register 216 and a parallel output register 217 which are connected to an input/output buffer 215. The controls of accesses from the exterior to both the registers 216, 217, etc. are performed by a bus interface controller 218 which is supplied with a chip select signal CS, a read/write signal R/W, function signals F0-F3 of 4 bits, etc. The function signals F0-F3 are control signals by which, in the selected state of the chip, the register 216, 217, a program counter 240 and a control register 231 to be described later, etc. are selected so as to be readable and writable directly from the exterior, in accordance with the combined states of the logic values of the respective bits. By way of example, these control signals are held in correspondence with the predetermined bits of address signals which are delivered from the host processor not shown.

The input analog circuit subsection 3 and the output analog circuit subsection 4 are interfaced by a serial input register 220 and a serial output register 221 which are connected to the internal data bus 204. Although not especially restricted, the input/output controls of the registers 220 and 221 are performed by a serial interface controller 222 which receives the sampling enable clock signals RSAM1, TSAM1, etc. The serial interface controller 222 begins to impress serial input clock pulses SICK on the serial input register 220 at a predetermined timing synchronous with the change of the sampling enable clock signal RSAM1, and thus controls this register 220 so as to accept data items which are delivered from the first selector circuit 36 in bit-serial fashion. Besides, it begins to impress serial output clock pulses SOCK on the serial output register 221 at a predetermined timing synchronous with the change of the sampling enable clock signal TSAM1 and thus controls this register 221 so as to send data items to the second selector circuit 46 in bit-serial fashion. The sampling enable clock signals RSAM1 and TSAM1 are respectively produced from programmable timers 224 and 225, which are set by the controls of the host processor or microprogram controls though no special restriction is meant.

Further coupled to the data bus 204 are an address pointer 230, the control register 231, a status register 232, a repeat counter 233, a condition code register 234, a delay register 235 and a general-purpose register array 236.

The address pointer 230 serves for the addressing of the data RAM 200, data ROM 201 and general-purpose register array 236. The status register 232 holds flags which reflect the internal statuses of the digital signal processor 1, for example, the data input/output statuses and interrupt mask statuses of the parallel input register 216 and parallel output register 217. The control register 231 holds various conditions for controlling the operations of the digital signal processor 1. The repeat counter 233 is utilized for counting the number of times of the recurring executions of, e.272 g., a repetition instruction for a multiply-and-sum computation or the like. The delay register 235 is utilized as a delay element for realizing a transversal filter, etc.

Although no special restriction is intended, the instruction control system of the digital signal processing unit 2 comprises the program counter 240 in which the address of an instruction to be executed next is held, stack registers 241-244 which make it possible to save the value of the program counter 240 up to the nest number of 4 on account of the occurrences of an external interrupt and a jump/branch, a micro-ROM 245 in which the operating program of the digital signal processing section 2 is held in the form of, for example, a plurality of series of microinstructions and which is addressed by the output of the program counter 240, a microinstruction register 246 in which the microinstruction delivered from the micro-ROM 245 is fetched, a microinstruction decoder 247 by which the microinstruction delivered from the microinstruction register 246 is decoded so as to produce any of various internal control signals etc., and a function mode controller 248 which performs the address controls of the microinstructions, etc. on the basis of the occurrences of interrupts, etc.

The instruction address control and interrupt control by the function mode controller 248 proceed in accordance with information items delivered from the bus interface controller 218 and serial interface controller 222, that is, information items instructive of the input-/output operations of the serial input register 220 and serial output register 221, an information item instructive of a direct access from the exterior to any internal register, and so on. Besides, the function mode controller 248 controls the generation of a branch destination address for branching a microprogram to a required processing routine in accordance with the sorts of the information items, as well as a save process and a return process which are attendant upon the branch. By the way, in the sequence of executing a group of microinstructions, the next addresses of the micro-ROM 245 can also be afforded through the microinstruction register 246 though no special restriction is meant.

The operating program held in the micro-ROM 245 conforms to a horizontal type microinstruction scheme which can execute a plurality of operations within an identical instruction cycle in order to enhance the throughput of arithmetic instructions. The operations which can be executed in parallel by one instruction cycle, are the operations of the multiplier unit 206, the operations of the arithmetic-logic unit 207, read/write accesses to the data ROM 201 or RAM 200 and the various registers, and so on. The multiplier unit 206 is capable of the multiplying operations in any of instruction cycles, and it executes the multiplication when input data is selected by an instruction. The result of the multiplication is accumulated in the register 210, and an addition/subtraction in the arithmetic-logic unit 207 is executed in the next instruction cycle by utilizing the multiplicational result. Thus, the multiplication and addition are carried out in parallel in pipeline fashion, and the multiply-and-sum computation is efficiently carried out apparently within one instruction cycle.

Here, the respective selection signals SEL1 and SEL2 for the first selector circuit 36 and second selector circuit 46 are produced from the microinstruction decoder 247 though not especially restricted. More specifically, information items for selecting the first selector circuit 36 and second selector circuit 46 are set in the control register 231 by internal operations or from the exterior. For example, when the sampling enable clock signal RSAM1 rises to instruct the operation of inputting an analog signal, the function mode controller 248 is informed to that effect by the serial interface controller 222, and it issues an interrupt. Thus, a microprogram which is being run is branched to the processing routine of data held in the serial input register 220. As the pre-processing of the branch, the function mode controller 248 decides the cause of the internal interrupt, while it refers to the selection information for the first selector circuit 36 as stored in the control register 231 and supplies the first selector circuit 36 with the selection signal SEL1 for selecting the A/D conversion unit corresponding to the selection information. On the other hand, when the sampling enable clock signal TSAM1 rises to instruct the operation of outputting an analog signal, the function mode controller 248 is informed to that effect by the serial interface controller 222. Then, the function mode controller 248 issues an interrupt, and a microprogram which is being run is branched to the processing routine of transferring data to-be-output to the serial output register 221. As the pre-processing of the transfer, the function mode controller 248 decides the cause of the interrupt, while it refers to the selection information for the second selector circuit 46 as stored in the control register 231 and supplies the second selector circuit 46 with the selection signal SEL2 for selecting the D/A conversion unit corresponding to the selection information.

In the case where the selection signals SEL1 and SEL2 are produced from the microinstruction decoder 247 in this manner, the individual processing operations of the respective A/D and D/A conversion units have the microinstruction series which differ wholly or partly. In that case, accordingly, the processing operations can also have contents which conform to the conversion characteristics of the A/D and D/A conversion units.

Incidentally, the predetermined bits of the output of the control register 231 may well be directly delivered to the first selector circuit 36 and second selector circuit 46 as the respective selection signals SEL1 and SEL2.

The digital signal processing unit 2 shown in FIG. 7 is subjected to the microprogram control, and it is also capable of such a complicated arithmetic control that the step of running the operating program of this unit 2 is branched in accordance with an internal or external status. Moreover, since the multiplier unit 206 in the form of a hardware element is comprised, the efficiency of multiply-and-sum computations which develop frequently in digital signal processing can be enhanced, and this facilitates ensuring the continuity of analog signals required in case of transferring the signals in full duplex, conjointly with the fact that the A/D conversion unit and D/A conversion unit in the analog circuit section can be operated in parallel. It is also easy to cope in multichannel fashion with a modem in which data communications are performed with the speech band by modulation and demodulation.

Figure 9:
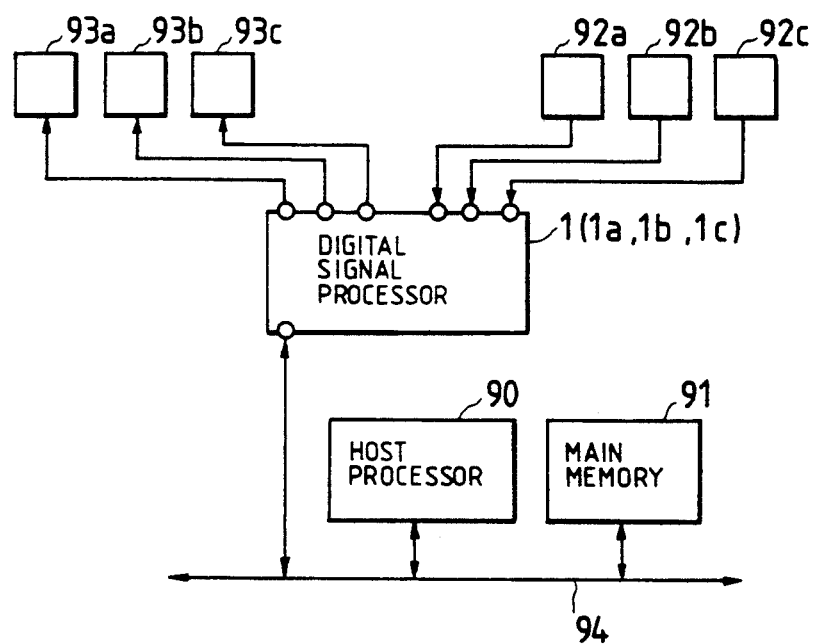
FIG. 9 is a block diagram of an example of a system in which the digital signal processor according to the present invention is applied to a servo control.

FIG. 9 shows an example of a system architecture which employs the digital signal processor 1 (1a, 1b or 1c). The system depicted in the figure is one wherein the work table or work head of a machine tool is servo-controlled in three dimensions or as to three axes. The digital signal processor 1 is interfaced with a system bus 94 to which a host processor 90, a main memory 91, etc. are coupled. The input analog circuit unit 3 is supplied with the output signals of first external devices 92a, 92b and 92c including sensors, for example, potentiometers which detect the positions of control levers or the likes for moving the work table or work head in X-, Y- and Z-directions, respectively. The output analog circuit unit 4 is connected to second external devices 93a, 93b and 93c such as actuators for moving the work table or work head in the X-, Y- and Z-directions, respectively. In this system, when commands for moving the work table or work head are detected by the sensors of the first external devices 92a, 92b and 92c, the digital signal processor 1 sequentially repeats the operations of supplying the second external device 93a with a drive command corresponding to an input from the first external device 92a, the second external device 93b with a drive command corresponding to an input from the first external device 92b, and the second external device 93c with a drive command corresponding to an input from the first external device 92c, in time-division fashion and in accordance with predetermined timings. Thus, the work table or work head of the machine tool can be servocontrolled in three dimensions by the use of the single digital signal processor 1.

Although, in the above, the invention made by the inventors has been concretely described on the basis of the embodiments, it is needless to say that the present invention is not restricted to the foregoing embodiments, but that it can be variously altered within a scope not departing from the purport thereof.

By way of example, the architecture which has the analog signal inputs/outputs corresponding to the three channels has been exemplified in the embodiments, but the implementation of any other multichannel arrangement is not hampered. Moreover, the arrangement of the digital signal processing section is not restricted to that shown in FIG. 7, but it can be properly altered at need.

Although, in the foregoing, the invention made by the inventors has been chiefly described concerning the cases of the applications to the servo-controls of a modem, a machine tool, etc. which form the background field of utilization thereof, the present invention is not restricted thereto, but it is applicable to a variety of systems which require digital signal processing, for the controls of sound, voice, communications etc.

Effects which are attained by typical aspects of performance of the present invention, will be briefly explained below.

An A/D conversion unit and a D/A conversion unit are connected to a digital signal processing section so as to be capable of operating in parallel with each other, and analog signal inputs/outputs are processed in a multichannel way. These bring forth the effect that the analog signals of a plurality of systems can be processed in time division and with the continuity of the analog signals ensured, by the use of a single digital signal processor.

Moreover, a multiplier unit is included in the digital signal processing section, thereby to enhance the efficiency of a multiply-and-sum computation, and the steps of running an operating program are made alterable in accordance with a phenomenon occurring internally or externally. These can enhance the processing capability of the processor in the case of supporting the multichannel processing of the analog signal inputs/outputs.

On this occasion, when an expedient for the multichannel processing is such that the plurality of sets of A/D and D/A conversion units are arranged and that predetermined ones are respectively selected from among the plurality of A/D and D/A conversion units in accordance with the processing steps or with the required accuracy of digital signal processing, there is the effect that the single digital signal processor can cope with even the analog signal inputs/ outputs whose characteristics such as analog signal frequencies are different.

On the other hand, when an expedient for the multichannel processing is such that the A/D and D/A conversion units in one set are arranged and that the analog signal input and output terminals to be connected thereto are selected through a multiplexer and a demultiplexer, the multichannel processing of the analog signals whose characteristics are uniform can be achieved with the smallest circuit scale.

Besides, the digital signal processor is made capable of such a complicated arithmetic control that the step of running the operating program of the digital signal processing section is branched in accordance with an internal or external status, and it comprises the multiplier unit in the form of a hardware element, thereby making it possible to enhance the efficiency of multiply-and-sum computations which develop frequently in the digital signal processing. These facilitate ensuring the continuity of analog signals required in case of transferring the signals in full duplex, conjointly with the fact that the A/D conversion units and D/A conversion units in an analog circuit section can be operated in parallel. It is also facilitated to cope in multichannel fashion with a modem in which data communications are performed with the speech band by modulation and demodulation.

What is claimed is:
1. A digital signal processor comprising:
a plurality of first external terminals;
a plurality of second external terminals;
a plurality of analog-to-digital converter circuits coupled to said plurality of first external terminals so that each of said plurality of analog-to-digital converter circuits corresponds to a predetermined one of said first external terminals;
a plurality of digital-to-analog converter circuits coupled to said plurality of second external terminals so that each of said plurality of digital-to-analog converter circuits corresponds to a predetermined one of said second external terminals;
first selector means for selecting one of said plurality of analog-to-digital converter circuits in accordance with a first selection signal;
second selector means for selecting one of said plurality of digital-to-analog converter circuits in accordance with a second selection signal; and a processing unit coupled to said first and second selector means, wherein said processing unit inputs a first digital signal from said selected one of said plurality of analog-to-digital converter circuits and outputs a second digital to said selected one of said plurality of digital-to-analog converter circuits, and said processing unit including, instruction memory means for storing instructions to execute corresponding predetermined operations, instruction decode means for outputting control signals in accordance with an instruction provided from said instruction memory means, wherein said control signals include said first selection signal for indicating selection of said one of said plurality of analog-to-digital converter circuits and include said second selection signal for indicating selection of said one of said plurality of digital-to-analog converter circuits, arithmetic logic means for performing addition and subtraction operations in accordance with said control signals, multiply means for performing a multiply operation in accordance with said control signals, and timer means for outputting first and second sampling clock signals in response to a value set in accordance with an instruction in said instruction memory means, wherein said selected one of said plurality of analog-to-digital converter circuits converts a first analog signal into said first digital signal in accordance with said first sampling clock signal, and wherein said selected one of said plurality of digital-to-analog converter circuits converts said second digital signal into a second analog signal in accordance with said second sampling clock signal.

2. A digital signal processor according to claim 1, further comprising a first register which stores said first digital signal from said selected one of said plurality of analog-to-digital converter circuits and a second register which stores said second digital signal to be provided to said selected one of said plurality of digital-to-analog circuits.

3. A digital signal processor according to claim 2, further comprising control means for outputting input and output clock signals in response to said first and second sampling clock signals, wherein said first register is inputted with said first digital signal from said selected one of said plurality of analog-to-digital converter circuits, in accordance with the input clock signal, and wherein said second register outputs said second digital signal to said selected one of said plurality of digital-to-analog converter circuits, in accordance with the output clock signal.

4. A digital signal processor according to claim 1, wherein said first and second sampling clock signals are out of phase with each other.

5. A digital signal processor according to claim 1, wherein said digital signal processor is formed on a single semiconductor substrate.

6. A digital signal processor according to claim 1, wherein said first and second selection signals are two-bit control signals.

7. A digital signal processor according to claim 1, further comprising a host processor interfaced with said processing unit.

8. A digital signal processor system comprising:
a plurality of first external terminals each of which has a single first external device coupled thereto;
a plurality of second external terminals each of which has a single second external device coupled thereto;
a plurality of analog-to-digital converter circuits coupled to said plurality of first external terminals so that each of said plurality of analog-to-digital converter circuits corresponds to a predetermined one of said first external terminals;
a plurality of digital-to-analog converter circuits coupled to said plurality of second external terminals so that each of said plurality of digital-to-analog converter circuits corresponds to a predetermined one of said second external terminals;
first selector means for selecting one of said plurality of analog-to-digital converter circuits in accordance with a first selection signal;
second selector means for selecting one of said plurality of digital-to-analog converter circuits in accordance with a second selection signal; and
a processing unit coupled to said first and second selector means, wherein said processing unit inputs a first digital signal from said selected one of said plurality of analog-to-digital converter circuits and outputs a second digital signal to said selected one of said plurality of digital-to-analog converter circuits; and said processing unit including, instruction memory means for storing instructions to execute corresponding predetermined operations, instruction decode means for outputting control signals in accordance with an instruction provided from said instruction memory means, wherein said control signals include said first selection signal for indicating selection of said one of said plurality of analog-to-digital converter circuits and include said second selection signal for indicating selection of said one of said plurality of digital-to-analog converter circuits, arithmetic logic means for performing addition and subtraction operations in accordance with said control signals, multiply means for performing a multiply operation in accordance with said control signals, and timer means for outputting first and second sampling clock signals in response to a value set in accordance with an instruction in said instruction memory means, wherein said selected one of said plurality of analog-to-digital converter circuits converts a first analog signal into said first digital signal in accordance with said first sampling clock signal, and wherein said selected one of said plurality of digital-to-analog converter circuits converts said second digital signal into a second analog signal in accordance with said second sampling clock signal.

9. A digital signal processor system according to claim 8, wherein said processing unit includes a first register which stores said first digital signal from said selected one of said plurality of analog-to-digital converter circuits and a second register which stores said second digital signal to be provided to said selected one of said plurality of digital-to-analog converter circuits.

10. A digital signal processor system according to claim 9, wherein said processing unit includes control means for outputting input and output clock signals in response to said first and second sampling clock signals, wherein said first register is inputted with said first digital signal from said selected one of said plurality of analog-to-digital converter circuits, in accordance with the input clock signal, and wherein said second register outputs said second digital signal to said selected one of said plurality of digital-to-analog converter circuits, in accordance with the output clock signal.

11. A digital signal processor system according to claim 8, wherein said first and second sampling clock signals are out of phase with each other.

12. A digital signal processor system according to claim 8, wherein said first and second selection signals are two-bit control signals.

13. A digital signal processor system according to claim 8, further comprising a host processor interfaced with said processing unit.

14. A digital signal processor comprising:
   a plurality of first external terminals;
   a plurality of second external terminals;
   first selector means coupled to said plurality of first external terminals and for selecting one of said plurality of first external terminals in accordance with a first selection signal;
   second selector means coupled to said plurality of second external terminals and for selecting one of said plurality of second external terminals in accordance with a second selection signal;
   an analog-to-digital converter circuit coupled to said first selector means and for converting a first analog signal provided from said one of said plurality of first external terminals into a first digital signal;
   a digital-to-analog converter circuit coupled to said second selector means and for converting a second digital signal into a second analog signal to be supplied to said selected one of said plurality of second external terminals; and
   a processing unit coupled to said analog-to-digital and digital-to-analog converter circuits, wherein said processing unit inputs said first digital signal from said analog-to digital converter circuit and outputs said second digital signal to said digital-to-analog converter circuit, and said processing unit including,
   instruction memory means for storing instructions to execute corresponding predetermined operations,
   instruction decode means for outputting control signals in accordance with an instruction provided from said instruction memory means, wherein said control signals include said first selection signal for indicating selection of one of said plurality of first external terminals and said second selection signal for indicating selection of one of said plurality of second external terminals,
   arithmetic logic means for performing addition and subtraction operation in accordance with said control signals,
   multiply means for performing a multiply operation in accordance with said control signals, and
   timer means for outputting first and second sampling clock signals in response to a value set in accordance with an instruction in said instruction memory means, wherein said analog-to-digital converter circuit converts said first analog signal into said first digital signal in accordance with the first sampling clock signal, and wherein said digital-to-analog converter circuit converts said second digital signal into said second analog signal in accordance with the second sampling clock signal.

15. A digital signal processor according to claim 14, further comprising a first register which stores said first digital signal from said analog-to-digital converter circuit and a second register which stores said second digital signal to be provided to said digital-to-analog converter circuit.

16. A digital signal processor according to claim 15, further comprising control means for outputting input and output clock signals in response to said first and second sampling clock signals, wherein said first register is inputted with said first digital signal from said analog-to-digital converter circuit, in accordance with the input clock signal, and wherein said second register outputs said second digital signal to said digital-to-analog converter circuit, in accordance with the output clock signal.

17. A digital signal processor according to claim 14, wherein said first and second sampling clock signals are out of phase with each other.

18. A digital signal processor according to claim 14, wherein said digital signal processor is formed on a single semiconductor substrate.

19. A digital signal processor according to claim 14, wherein said first and second selection signals are two-bit control signals.

20. A digital signal processor according to claim 14, further comprising a host processor interfaced with said processing unit.

21. A digital signal processor system comprising:
   a plurality of first external terminals each of which has a single first external device coupled thereto;
   a plurality of second external terminals each of which has a single second external device coupled thereto;
   first selector means coupled to said plurality of first external terminals and for selecting one of said plurality of first external terminals in accordance with a first selection signal;
   second selector means coupled to said plurality of second external terminals and for selecting one of said plurality of second external terminals in accordance with a second selection signal;
   an analog-to-digital converter circuit coupled to said first selector means and for converting a first analog signal provided from said selected one of said plurality of first external terminals into a first digital signal;
   a digital-to-analog converter circuit coupled to said second selector means and for converting a second digital signal into a second analog signal to be supplied to said selected one of said plurality of second external terminals; and
   a processing unit coupled to said analog-to-digital and digital-to-analog converter circuits, wherein said processing unit inputs said first digital signal from said selected analog-to-digital converter circuit and outputs said second digital signal to said selected digital-to-analog converter circuit, and said processing unit including,
   instruction memory means for storing instructions to execute predetermined operations,
   instruction decode means for outputting control signals in accordance with an instruction provided from said instruction memory means, wherein said control signals include said first selection signal for indicating selection of said one of said plurality of first external terminals and said second selection signal for indicating selection of said one of said plurality of second external terminals,
   arithmetic logic means for performing addition and subtraction operations in accordance with said control signals, multiply means for performing a multiply operation in accordance with said control signals, and timer means for outputting first and second sampling clock signals in response to a value set in accordance with an instruction in said instruction memory means, wherein said analog-to-digital converter circuit converts said first analog signal into said first digital signal in accordance with the first sampling clock signal, and wherein said digital-to-analog converter circuit converts said second digital signal into said second analog signal in accordance with the second sampling clock signal.

22. A digital signal processor system according to claim 21, wherein said processing unit includes a first register which stores said first digital signal from said analog-to-digital converter circuit and a second register which stores said second digital signal to be provided to said digital-to-analog converter circuit.

23. A digital signal processor system according to claim 22, wherein said processing unit includes control means for outputting input and output clock signals in response to said first and second sampling clock signals, wherein said first register is inputted with said first digital signal from said analog-to-digital converter circuit, in accordance with the input clock signal, and wherein said second register outputs said second digital signal to said digital-to-analog converter circuit, in accordance with the output clock signal.

24. A digital signal processor system according to claim 21, wherein said first and second sampling clock signals are out of phase with each other.

25. A digital signal processor system according to claim 21, wherein said first and second selection signals are two-bit control signals.

26. A digital signal processor system according to claim 21, further comprising a host processor interfaced with said processing unit.

27. A digital signal processor comprising:
a plurality of first external terminals;
a plurality of second external terminals;
a plurality of analog-to-digital converter circuits coupled to said plurality of first external terminals so that each of said plurality of analog-to-digital converter circuits corresponds to a predetermined one of said first external terminals;
a plurality of digital-to-analog converter circuits coupled to said plurality of second external terminals so that each of said plurality of digital-to-analog converter circuits corresponds to a predetermined one of said second external terminals;
first selector means for selecting one of said plurality of analog-to-digital converter circuits in accordance with a first selection signal;
second selector means for selecting one of said plurality of digital-to-analog converter circuits in accordance with a second selection signal; and
a processing unit coupled to said first and second selector means, wherein said processing unit inputs a first digital signal form said selected one of said plurality of analog-to-digital converter circuits and outputs a second digital signal to said selected one of said plurality of digital-to-analog converter circuits, and said processing unit including,
instruction memory means for storing instructions to execute corresponding predetermined operations,
instruction decode means for outputting control signals in accordance with an instruction provided from said instruction memory means, wherein said control signals include said first selection signal for indicating selection of said one of said plurality of analog-to-digital converter circuits and include said second selection signal for indicating selection of said one of said plurality of digital-to-analog converter circuits,
arithmetic logic means for performing addition and subtraction operations in accordance with said control signals,
multiply means for performing a multiply operation in accordance with said control signals, and
timer means for outputting pairs of first and second sampling clock signals in accordance with an instruction in said instruction memory means, wherein each of said pairs of first and second sampling clock signals is out of phase with the other pairs of first and second sampling clock signals, and wherein said selected one of said plurality of analog-to-digital converter circuits converts a first analog signal into said first digital signal in accordance with the first sampling clock signal of a selected one of said pairs of first and second sampling clock signals, and said selected one of said plurality of digital-to-analog converter circuits converts said second digital signal into a second analog signal in accordance with the second sampling clock signal of said selected one of said pairs of first and second sampling clock signals.

28. A digital signal processor according to claim 27, wherein said digital signal processor is formed on a single semiconductor substrate.

29. A digital signal processor according to claim 27, further comprising a host processor interfaced with said processing unit.

30. A digital signal processor comprising:
a plurality of first external input terminals;
a plurality of second external input terminals;
a plurality of first external output terminals;
a plurality of second external output terminals;
first selector means coupled to said plurality of second external input terminals and for selecting one of said plurality of second external input terminals in accordance with a first selection signal;
a plurality of analog-to-digital converter circuits, wherein one of said plurality of analog-to-digital converter circuits is coupled to said first selector means, and the remaining plurality of analog-to-digital converters is coupled to said plurality of first external input terminals so that each of the remaining plurality of analog-to-digital converter circuits corresponds to a predetermined one of said first external input terminals;
second selector means for selecting one of said plurality of analog-to-digital converter circuits in accordance with a second selection signal;
third selector means coupled to said plurality of second external output terminals and for selecting one of said plurality of second external output terminals in accordance with a third selection signal;
a plurality of digital-to-analog converter circuits, wherein one of said plurality of digital-to-analog converter circuits is couple to said third selector means and wherein the remaining plurality of digital-to-analog converter circuits is coupled to said plurality of first external output terminals so that each of the remaining plurality of analog-to-digital converter circuits corresponds to a predetermined one of said first external output terminals;

fourth selector means for selecting one of said plurality of digital-to-analog converter circuits in accordance with a fourth selection signal; and a processing unit coupled to said second and fourth selector means, wherein said processing unit inputs a first digital signal from said selected one of said plurality of analog-to-digital converter circuits and outputs a second digital signal to said selected one of said plurality of digital-to-analog converter circuits, and said processing unit including, instruction memory means for storing instructions to execute corresponding predetermined operations, instruction decode means for outputting control signals in accordance with an instruction provided from said instruction memory means, wherein said control signals include said second selection signal for indicating selection of said one of said plurality of analog-to-digital converter circuits and include said fourth selection signal for indicating selection of one of said plurality of digital-to-analog converter circuits, arithmetic logic means for performing addition and subtraction operations in accordance with said control signals, multiply means for performing a multiply operation in accordance with said control signals, and timer means for outputting first and second sampling clock signals in response to a value set in accordance with an instruction in said instruction memory means, wherein said selected one of said plurality of analog-to-digital converter circuits converts a first analog signal into said first digital signal in accordance with said first sampling clock signal, and wherein said selected one of said plurality of digital to analog convert circuits converts said second digital signal into a second analog signal in accordance with said second sampling clock signal.

31. A digital signal processor according to claim 30, wherein said first and second sampling clock signals are out of phase with each other.

32. A digital signal processor according to claim 30, wherein said digital signal processor is formed on a single semiconductor substrate.

33. A digital signal processor according to claim 30, wherein said first, second, third and fourth selection signals are two-bit control signals.

34. A digital signal processor according to claim 30, further comprising a host processor interfaced with said processing unit.

* * * * *